(12) United States Patent
Kim et al.

(10) Patent No.: US 9,834,709 B2
(45) Date of Patent: Dec. 5, 2017

(54) PRESSURE SENSITIVE ADHESIVE COMPOSITION

(71) Applicant: LG Chem, Ltd., Seoul (KR)

(72) Inventors: Su Jeong Kim, Daejeon (KR); Jeong Ae Yoon, Daejeon (KR); Sung Soo Yoon, Daejeon (KR); Kee Young Kim, Daejeon (KR); Min Ki Lee, Daejeon (KR); Sang Hyun Hong, Daejeon (KR); Il Jin Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/912,016

(22) PCT Filed: Dec. 1, 2014

(86) PCT No.: PCT/KR2014/011627
§ 371 (c)(1),
(2) Date: Feb. 12, 2016

(87) PCT Pub. No.: WO2015/080536
PCT Pub. Date: Jun. 4, 2015

(65) Prior Publication Data
US 2016/0194532 A1    Jul. 7, 2016

(30) Foreign Application Priority Data

Nov. 29, 2013 (KR) .......... 10-2013-0147840
Dec. 1, 2014 (KR) .......... 10-2014-0169638

(51) Int. Cl.
| | | |
|---|---|---|
| C09J 153/00 | (2006.01) | |
| C09J 7/02 | (2006.01) | |
| G02B 1/14 | (2015.01) | |
| G02B 5/30 | (2006.01) | |
| C09J 201/02 | (2006.01) | |
| C08F 293/00 | (2006.01) | |
| C08K 5/43 | (2006.01) | |
| C08K 5/00 | (2006.01) | |
| C08K 3/00 | (2006.01) | |

(52) U.S. Cl.
CPC ......... *C09J 153/00* (2013.01); *C08F 293/005* (2013.01); *C09J 7/0239* (2013.01); *C09J 7/0246* (2013.01); *C09J 201/02* (2013.01); *G02B 1/14* (2015.01); *G02B 5/3033* (2013.01); *C08F 2438/01* (2013.01); *C08K 3/0066* (2013.01); *C08K 5/0075* (2013.01); *C08K 5/43* (2013.01); *C08K 2201/017* (2013.01); *C09J 2203/318* (2013.01); *C09J 2205/102* (2013.01); *C09J 2433/00* (2013.01); *C09J 2453/00* (2013.01); *C09J 2467/006* (2013.01); *G02B 5/30* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 7,255,920 B2 | 8/2007 | Everaerts et al. | |
| 2004/0097658 A1* | 5/2004 | Everaerts | C08F 293/005 525/244 |
| 2005/0197450 A1* | 9/2005 | Amano | C08K 5/0075 525/30 |
| 2009/0104445 A1* | 4/2009 | Inoue | C09D 133/26 428/355 N |
| 2009/0275705 A1* | 11/2009 | Fujita | C08F 293/00 525/342 |
| 2011/0135921 A1* | 6/2011 | Tse | C08F 297/026 428/355 AC |
| 2012/0058334 A1* | 3/2012 | Okamoto | C09J 5/06 428/355 AC |
| 2014/0066539 A1* | 3/2014 | Tobing | C09J 153/00 522/46 |
| 2014/0242303 A1* | 8/2014 | Lee | G02B 5/3025 428/1.55 |
| 2015/0086781 A1* | 3/2015 | Chi | C08K 5/105 428/354 |
| 2015/0093570 A1 | 4/2015 | Tse et al. | |
| 2015/0111033 A1 | 4/2015 | Song et al. | |

FOREIGN PATENT DOCUMENTS

| | | |
|---|---|---|
| EP | 3012304 A1 | 4/2016 |
| JP | 11-116644 A | 4/1999 |
| JP | 2001-131250 A | 5/2001 |
| JP | 2009126929 A | 6/2009 |
| JP | 2009-173875 A | 8/2009 |

(Continued)

OTHER PUBLICATIONS

Definition of "homopolymer", Online Merriam-Webster dictionary, retrived on Jun. 4, 2017.*
International Search Report for Application No. PCT/KR2014/011627 dated Feb. 26, 2015.
International Written Opinion for Application No. PCT/KR2014/011627 dated Feb. 26, 2015.
Extended European Search Report for Application No. EP14866262 dated Jun. 22, 2017.

(Continued)

*Primary Examiner* — Anish P Desai
(74) *Attorney, Agent, or Firm* — Lerner, David, Littenberg, Krumholz & Mentlik, LLP

(57) ABSTRACT

Provided are a pressure-sensitive adhesive composition, a protection film, an optical laminate, a polarizing plate, and a display device. Provided is the pressure-sensitive adhesive composition which is excellent in various physical properties, such as endurance reliability, has excellent antistatic characteristics that change little over time. The pressure-sensitive adhesive composition can be used for a protection film, or can be used for an optical film, such as a polarizing plate, for example.

18 Claims, No Drawings

(56) References Cited

FOREIGN PATENT DOCUMENTS

| | | |
|---|---|---|
| JP | 2011514416 A | 5/2011 |
| JP | 2012-237965 A | 12/2012 |
| KR | 2008-0024215 | 3/2008 |
| KR | 2011-0008028 A | 1/2011 |
| KR | 10-1023839 | 3/2011 |
| KR | 10-1171976 | 8/2012 |
| KR | 10-1171977 | 8/2012 |
| WO | 2009111433 A1 | 9/2009 |
| WO | 2009117654 A1 | 9/2009 |

OTHER PUBLICATIONS

Krause S et al, "Glass Temperatures of Some Acrylic Polymers", Journal of Polymer Science, Interscience Publishers, XX, vol. 3, Jan. 1, 1965 (Jan. 1, 1965), pp. 3573-3586, XP001104966.

\* cited by examiner

PRESSURE SENSITIVE ADHESIVE COMPOSITION

CROSS-REFERENCE TO RELATED APPLICATION

This application is a national phase entry under 35 U.S.C. §371 of International Application No. PCT/KR2014/011627, filed Dec. 1, 2014, which claims priority to Korean Patent Application No. 10-2013-0147840, filed Nov. 29, 2013 and Korean Patent Application No. 10-2014-0169638, filed Dec. 1, 2014, the disclosures of which are incorporated herein by reference.

TECHNICAL FIELD

The present application relates to a pressure-sensitive adhesive composition, a protection film, an optical laminate, a polarizing plate, and a display device.

BACKGROUND

A pressure-sensitive adhesive may be used for various uses. For example, the pressure-sensitive adhesive may be used for the purpose of adhering an optical film, such as a polarizing plate or a retardation film on a display device, such as a liquid crystal display device (hereinafter referred to as an "LCD device") or for the purpose of mutually laminating the optical films, such as the polarizing plate or the retardation film. In some cases, the pressure-sensitive adhesive that is used for the optical film or the like requires cohesive strength, adhesiveness, re-workability, or low light leakage characteristic together with excellent transparency. For example, Patent Documents 1 to 3 propose an optical adhesive composition so as to achieve the physical properties as described above.

In addition, a pressure-sensitive adhesive may require an antistatic property if necessary, and for example, Patent Documents 4 and 5 disclose the pressure-sensitive adhesive capable of securing the antistatic property.

PRIOR ART DOCUMENT

Patent Document

Patent Document 1: Korean Patent No. 1023839
Patent Document 2: Korean Patent No. 1171976
Patent Document 3: Korean Patent No. 1171977
Patent Document 4: Japanese Laid-Open Patent Publication No. 2009-173875
Patent Document 5: Korean Laid-Open Patent Publication No. 2008-0024215

DESCRIPTION

Technical Object

The present application is directed to a pressure-sensitive adhesive composition, a protection film, an optical laminate, a polarizing plate, and a display device.

Technical Solution

An illustrative pressure-sensitive adhesive composition may include a block copolymer. In the present specification, the term "block copolymer" may refer to a copolymer containing the blocks of different polymerized monomers.

In one example, the block copolymer may include a first block having a glass transition temperature of 50° C. or higher and a second block having a glass transition temperature of −10° C. or lower. In the present specification, a "glass transition temperature of a predetermined block" of the block copolymer may refer to a glass transition temperature measured from the polymer that is formed only with the monomers included in the block.

In one example, the glass transition temperature of the first block may be 60° C. or higher, 65° C. or higher, 70° C. or higher, 75° C. or higher, 80° C. or higher, 85° C. or higher, 90° C. or higher, 95° C. or higher, 100° C. or higher or 105° C. or higher. In addition, in the present application, the upper limit of the glass transition temperature of the first block is not particularly limited. For example, the glass transition temperature of the first block may be about 150° C. or less, 140° C. or less, 130° C. or less, 120° C. or less or 115° C. or less.

For example, the glass transition temperature of the second block may be −20° C. or less, −30° C. or less, −35° C. or less or −40° C. or less. In addition, in the present application, the lower limit of the glass transition temperature of the second block is not particularly limited. For example, the glass transition temperature of the second block may be about −80° C. or higher, −70° C. or higher, −60° C. or higher, −55° C. or higher or −50° C. or higher.

The block copolymer containing at least two types of blocks having the glass transition temperatures, which are within the above-described range, respectively, may form a proper microphase-separated structure in a pressure-sensitive adhesive. The block copolymer having the microphase-separated structure formed therein may give proper cohesive strength and stress-relaxation property to the pressure-sensitive adhesive, and thereby the pressure-sensitive adhesive, in which the physical properties, such as endurance reliability, light-leakage prevention characteristics, and re-workability, are excellently maintained, may be formed.

In the block copolymers, for example, the first block may have the number average molecular weight (Mn) of about 2,500 to 150,000. For example, the number average molecular weight of the first block may refer to the number average molecular weight of the polymer that is prepared by polymerizing only the monomers forming the first block. The number average molecular weight disclosed in the present specification may be measured by the method disclosed in Examples using a gel permeation chromatograph (GPC), for example. In another example, the number average molecular weight of the first block may be 5,000 or more, 7,000 or more, 9,000 or more, 10,000 or more, 11,000 or more, 12,000 or more, 13,000 or more, 14,000 or more, 15,000 or more, 16,000 or more, 17,000 or more, or 18,000 or more. In addition, in another example, the number average molecular weight of the first block may be 130,000 or less, 100,000 or less, 90,000 or less, 80,000 or less, 70,000 or less, 60,000 or less, 50,000 or less, 40,000 or less, 30,000 or less, or 25,000 or less.

The block copolymer may have the number average molecular weight of about 50,000 to 300,000. In another example, the number average molecular weight of the block copolymer may be about 90,000 to 250,000, 90,000 to 200,000, 90,000 to 180,000, 90,000 to 170,000, 90,000 to 160,000, 90,000 to 150,000, 90,000 to 140,000, 90,000 to 130,000, 90,000 to 120,000, or 90,000 to 115,000.

In addition, in the block copolymer, the molecular weight distribution (PDI; Mw/Mn), that is, the ratio (Mw/Mn) of a weight average molecular weight (Mw) and a number average molecular weight (Mn) may be about 1.0 to about 2.5, about 1.4 to about 2.5, or about 1.45 to about 2.0.

The block copolymer having the above-described characteristics may form a pressure-sensitive adhesive composition or a pressure-sensitive adhesive having excellent physical properties.

The block copolymer may be a cross-linkable copolymer having a cross-linkable functional group. Examples of the cross-linkable functional group may include a hydroxyl group, a carboxyl group, an isocyanate group, or a glycidyl group, and for example, use a hydroxyl group.

When a cross-linkable functional group is included, the functional group may be included in the second block having a low glass transition temperature, for example. For example, in one example, the first block having a high glass transition temperature may include a cross-linkable functional group or may not include the cross-linkable functional group. For example, when the first block does not include the cross-linkable functional group, but only the second block includes the cross-linkable functional group, if the cross-linkable functional group is included in the second block, proper cohesive strength and stress-relaxation property are exhibited according to the variation in temperatures, and thereby the pressure-sensitive adhesive, in which the physical properties, such as endurance reliability, light-leakage prevention characteristics, and re-workability that are required for an optical film are excellently maintained, may be formed.

In addition, the block copolymer may include a polymerization unit which is derived from the compound that containing a nitrogen atom in the first block or second block thereof. For example, the polymerization unit which is derived from the compound containing a nitrogen atom may be included in the first block or second block or may be included in both of the first block and second block.

When the compound containing a nitrogen atom is included in the first block and/or the second block, for example, the ion association of an antistatic agent is inhibited and the uniformity of the distribution of the antistatic agent is improved by forming a chelate structure with the antistatic agent that is included together in a pressure-sensitive adhesive composition, and thus, for example, even when a pressure-sensitive adhesive is maintained under the condition of a high temperature or high humidity for a long period of time, a change in the antistatic performance over time may be suppressed.

In one example, examples of the compound containing a nitrogen atom may include an amide group-containing compound, an amino group-containing compound, an imide group-containing compound, or a cyano group-containing compound.

Examples of the amide group-containing compound may include (meth)acrylamide, N,N-dialkyl (meth)acrylamide, N-alkylrol (meth)acrylamide, diacetone (meth)acrylamide, N-vinylacetamide, N,N-alkylene bisacrylamide, N-hydroxyalkyl (meth)acrylamide, N-hydroxyalkyl aminoalkyl (meth)acrylamide, N-(2-aminoethyl)acrylamide hydrochloride, N-(3-aminopropyl)methacrylamide hydrochloride, N-(t-butoxycarbonyl-aminopropyl)methacrylamide, N,N-dialkylaminoalkyl (meth)acrylamide, N-vinylpyrrolidone, N-vinylcaprolactam, or (meth)acryloylmorpholine; examples of the amino group-containing compound may include aminoalkyl (meth)acrylate, N-alkylaminoalkyl (meth)acrylate, or N,N-dialkylaminoalkyl (meth)acrylate; examples of the imide group-containing compound may include N-alkyl maleimide or itaconimide; examples of the cyano group-containing compound may include (meth)acrylonitrile; and one or two or more types of them may be selected and then used so as to secure the above-described glass transition temperature.

When the above-described compound containing a nitrogen atom is used, for example, while re-peelability may be excellently controlled when a pressure-sensitive adhesive composition is applied to a protection film, and the like, the change in the surface resistance after the endurance of the pressure-sensitive adhesive may be effectively reduced over time.

Examples of the compound containing a proper nitrogen atom, which may be used in the present application may include aminoalkyl (meth)acrylate, alkylaminoalkyl (meth)acrylate, dialkylaminoalkyl (meth)acrylate, or hydroxyalkyl (meth)acrylamide, but the present application is not limited thereto.

In the present application, the term "alkyl" may be, unless otherwise defined herein, a linear, branched, or cyclic alkyl group having 1 to 20 carbon atoms, 1 to 16 carbon atoms, 1 to 12 carbon atoms, 1 to 8 carbon atoms, or 1 to 4 carbon atoms. The alkyl group may be arbitrarily substituted with one or more substituents, if necessary.

In one example, for example, the polymerization unit which is derived from the compound containing a nitrogen atom may be included in the ratio of about 1 wt % to 80 wt % with respect to the weight of the monomer that is included in the whole block copolymer as a polymerization unit. In another example, the above-described ratio may be 2 wt % or more, 3 wt % or more, or 3.5 wt % or more. In addition, in another example, the ratio may be 75 wt % or less, 70 wt % or less, 60 wt % or less, 65 wt % or less, 60 wt % or less, 55 wt % or less, 50 wt % or less, 45 wt % or less, 40 wt % or less, 35 wt % or less, 30 wt % or less, 25 wt % or less, 20 wt % or less, or 15 wt % or less. When the compound contains a nitrogen atom within the above-described range, for example, while the change in surface resistance over time may be suppressed, it is possible to reduce the problem, in that the re-peelability is decreased by the excessive increase in adhesive strength and also to suppress the problem that arises in the coating property, which is caused by the gelation of a resin caused by the agglomeration of pressure-sensitive adhesive.

In addition to the compound containing a nitrogen atom, a type of the monomer that forms the first block and second block is not particularly limited as long as a glass transition temperature is secured as described above by the combination of the respective monomers.

In one example, the first block may include the polymerization unit which is derived from (meth)acrylic acid ester monomers; or the (meth)acrylic acid ester monomers and the compound containing a nitrogen atom. In the present specification, the monomers that are included in the polymer or block as a polymerized unit may refer to the monomers that form the frame of the polymer or block, for example, a main chain or side chain by subjecting the monomers to the polymerization reaction.

Examples of the (meth)acrylic acid ester monomer may include alkyl (meth)acrylate. In consideration of the controls of cohesive strength, a glass transition temperature, and adhesiveness, the alkyl (meth)acrylate having an alkyl group of 1 to 20 carbon atoms, 1 to 16 carbon atoms, 1 to 12 carbon atoms, 1 to 8 carbon atoms, or 1 to 4 carbon atoms, may be used. Here, examples of the alkyl group may include a linear, branched, or cyclic type. Examples of the monomers may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)

acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate, and lauryl (meth)acrylate, and among them, one or two or more types may be selected and then used so as to secure the above-described glass transition temperature. In consideration of the ease of the control of glass transition temperature, as the monomers that form the first block, the methacrylic acid ester monomer, such as alkyl methacrylate, for example, an alkyl methacrylate having an alkyl group of 1 to 20 carbon atoms, 1 to 16 carbon atoms, 1 to 12 carbon atoms, 1 to 8 carbon atoms, or 1 to 4 carbon atoms, may be used among them, but the present application is not particularly limited thereto.

In a proper example, the first block may include alkyl methacrylate, for example, methyl methacrylate. For example, the first block may include the methyl methacrylate in the ratio of about 50 wt % or more, 60 wt % or more, 70 wt % or more, 80 wt % or more, or 90 wt % or more, with respect to the weight of the whole monomers that are included in the first block as a polymerization unit.

As the compound containing a nitrogen atom, which forms the first block, in consideration of copolymerization ability with other monomers that are included in the first block, physical properties and the like, a proper compound may be selected and then used among the above-described compounds containing a nitrogen atom.

In one example, when the compound containing a nitrogen atom is included in the first block, the first block may include the polymerized unit which is induced from 70 parts by weight to 99.9 parts by weight of the (meth)acrylic acid ester monomer and 0.1 parts by weight to 30 parts by weight of the compound containing a nitrogen atom. When the content of the compound containing a nitrogen atom is controlled within the above-described range, it is of advantage to control the polymerization unit which is derived from the compound containing a nitrogen atom, which is included in the above-described block copolymer, for example. This ratio range may be of advantage to provide the pressure-sensitive adhesive capable of securing the distribution uniformity of the antistatic agent and the physical properties, such as proper cohesive strength.

In the present specification, the unit "parts by weight" may refer to a ratio of weights between the respective components, if not disclosed separately.

The second block may include the polymerized unit which is derived from the (meth)acrylic acid ester monomers and the copolymeric monomers having a cross-linkable functional group; or the polymerized unit which is derived from the (meth)acrylic acid ester monomers, the copolymeric monomers having a cross-linkable functional group, and the compound containing a nitrogen atom. As the (meth)acrylic acid ester monomers that form the second block, among the monomers that may be included in the first block, a type of monomer, which may finally secure the glass transition temperature in the above-described range through the copolymerization with the above-described copolymeric monomers, may be selected and then used. In consideration of the ease of the control of glass transition temperature, as the (meth)acrylic acid ester monomers that form the second block, among the above-described monomers, an acrylic acid ester monomer, such as alkyl acrylate, for example, the alkyl acrylate having an alkyl group of 1 to 10 carbon atoms, 1 to 16 carbon atoms, 1 to 12 carbon atoms, 1 to 8 carbon atoms, or 1 to 4 carbon atoms, may be used.

As the copolymeric monomers having a cross-linkable functional group, for example, the monomers, which have the region that may be polymerized with other monomers included in the block copolymer like the (meth)acrylic acid ester monomers and also have the above-described cross-linkable functional group, are used, and thus the pressure-sensitive adhesive may exhibit proper cohesive strength and stress-relaxation property according to the variation of temperatures, thereby the pressure-sensitive adhesive having excellent endurance reliability, light-leakage prevention characteristics, and re-workability. In one example, a hydroxyl group may be used, for example, as the cross-linkable functional group.

Various copolymeric monomers having a cross-linkable functional group as described above are known in the field of pressure-sensitive adhesive preparation, and all of these monomers may be used for the above-described polymer. Examples of the copolymeric monomers having a hydroxyl group may include hydroxyalkyl (meth)acrylate, such as 2-hydroxyethyl (meth)acrylate, 2-hydroxypropyl (meth)acrylate, 4-hydroxybutyl (meth)acrylate, 6-hydroxyhexyl (meth)acrylate, or 8-hydroxyoctyl (meth)acrylate, or hydroxyalkyeneglycol (meth)acrylate, such as 2-hydroxyethyleneglycol (meth)acrylate or 2-hydroxypropyleneglycol (meth)acrylate, but the present application is not limited thereto. In consideration of the reactivity with other monomers that form the second block or the easy of the control of the glass transition temperature, among the above-described monomers, hydroxyalkyl acrylate or hydroxyalkyleneglycol acrylate may be used, but the present application is not limited thereto.

In consideration of the copolymerization ability with other monomers included in the second block and physical properties, as the compound containing a nitrogen atom, which forms the second block, a proper compound may be selected among the above-described compounds containing a nitrogen atom, and then used.

In one example, when the compound containing a nitrogen atom is only included in the first block, but not in the second block, the second block may include the polymerized unit which is derived from 60 parts by weight to 99 parts by weight or 60 parts by weight to 99.8 parts by weight of the (meth)acrylic acid ester monomer and 1 part by weight to 40 parts by weight or 0.1 parts by weight to 10 parts by weight of the copolymeric monomer having a cross-linkable functional group.

In one example, when the compound containing a nitrogen atom is included in the second block, the second block may include the polymerized unit which is derived from 60 parts by weight to 99.8 parts by weight of the (meth)acrylic acid ester monomer, 0.1 parts by weight to 10 parts by weight of the copolymeric monomer having a cross-linkable functional group, and 0.1 parts by weight to 30 parts by weight of the compound containing a nitrogen atom. For example, this ratio range may be of advantage to provide the pressure-sensitive adhesive capable of securing the distribution uniformity of antistatic agent and the physical properties, such as proper cohesive strength.

The first block and/or the second block may further include other arbitrary comonomers, if necessary, in order to control the glass transition temperature, for example, and the monomers may be included as a polymerization unit. Examples of the comonomers may include a monomer containing a nitrogen atom, such as (meth)acrylonitrile, (meth)acrylamide, N-methyl (meth)acrylamide, N-butoxy methyl(meth)acrylamide, N-vinylpyrrolidone, or N-vinyl caprolactam; a monomer including an alkyleneoxide group, such as alkoxy alkyleneglycol (meth)acrylic acid ester, alkoxy dialkyleneglycol (meth)acrylic acid ester, alkoxy trialkyleneglycol (meth)acrylic acid ester, alkoxy tetraalkyleneglycol (meth)acrylic acid ester, alkoxy polyethyleneglycol (meth)acrylic acid ester, phenoxy alkyleneglycol (meth) acrylic acid ester, phenoxy dialkyleneglycol (meth)acrylic acid ester, phenoxy trialkyleneglycol (meth)acrylic acid ester, phenoxy tetraalkyleneglycol (meth)acrylic acid ester, or phenoxy polyalkyeneglycol (meth)acrylic acid ester; a styrene-based monomer, such as styrene or methyl styrene; a monomer including a glycidyl group, such as glycidyl (meth)acrylate; or carboxylic acid vinyl ester, such as vinyl acetate, but the present application is not limited thereto. One or two or more proper types may be selected among these comonomers, if necessary, and then may be included. For example, these comonomers may be included in the ratio of 20 parts by weight or less, or 0.1 parts by weight to 15 parts by weight with respect to the total weights of other monomers that are used in the block, respectively, as a polymerization unit.

For example, the block copolymer may include 5 parts by weight to 50 parts by weight of the first block and 50 parts by weight to 95 parts by weight of the second block. The ratio of the weights between the first block and the second block may be controlled within the above-described range, thereby providing the pressure-sensitive adhesive composition and the pressure-sensitive adhesive having excellent physical properties. In another example, the block copolymer may include 5 parts by weight to 45 parts by weight of the first block and 55 parts by weight to 95 parts by weight of the second block or 5 parts by weight to 45 parts by weight of the first block and 60 parts by weight to 95 parts by weight of the second block.

In one example, the block copolymer may be a diblock copolymer including the first and second blocks, that is, a block copolymer including two blocks, the first and second blocks. By using the diblock copolymer, it is possible to maintain endurance reliability, a stress-relaxation property, and re-workability more excellently.

The method for preparing the block copolymer is not particularly limited, and the block copolymer may be prepared by a general way. For example, the block polymer may be polymerized by a living radical polymerization (LRP) way. Examples thereof may include anionic polymerization of synthesizing the polymer in the presence of an alkali metal or an inorganic acid salt, such as a salt of an alkali earth metal using an organic rare earth metal composite or an organic alkali metal compound as a polymerization initiator; an anionic polymerization method of synthesizing the polymer in the presence of an organic aluminum compound using an organic alkali metal compound as a polymerization initiator; an atom transfer radical polymerization (ATRP) using an atom transfer radical polymerizing agent as a polymerization controlling agent; an activators regenerated by electron transfer (ARGET) atom transfer polymerization (ATRP) of performing the polymerization in the presence of an organic or inorganic reducing agent that generates an electron using an atom transfer radical polymerizing agent as a polymerization controlling agent; an initiators for continuous activator regeneration atom transfer radical polymerization (ATRP); a polymerization by reversible addition fragmentation chain transfer (RAFT) using an inorganic reducing agent reversible addition fragmentation chain transferring agent; or a method using an organic tellurium compound as an initiator, and among these methods, a proper method may be selected and then applied.

The pressure-sensitive adhesive composition may further include a cross-linking agent that can allow the block copolymer to be cross-linked. The cross-linking agent may be a compound having at least two functional groups that can react with a hydroxyl group or the above-described cross-linkable functional group, and these kinds of the compounds are variously known. Examples of the cross-linking agent may include an isocyanate cross-linking agent, an epoxy cross-linking agent, an aziridine cross-linking agent, or a metal chelate cross-linking agent, and for example, an isocyanate cross-linking agent may be used.

Examples of the isocyanate cross-linking agent may include diisocyanate compounds, such as tolylene diisocyanate, xylene diisocyanate, diphenylmethane diisocyanate, hexamethylene diisocyanate, isoboron diisocyanate, tetramethylxylene diisocyanate, or naphthalene diisocyanate, or the compound prepared by performing reacting of the diisocyanate compound and polyol, and for example, trimethylolpropane may be used as the polyol.

For the pressure-sensitive adhesive composition, one or two or more cross-linking agents among them may be used, but the cross-linking agent that can be used is not limited thereto.

For example, the multifunctional cross-linking agent may be included in the pressure-sensitive adhesive composition in the amount of 0.01 parts by weight to 10 parts by weight or 0.01 parts by weight to 5 parts by weight with respect to 100 parts by weight of the block copolymer, and within this range, gel fraction, cohesive strength, adhesiveness, and endurance reliability of the pressure-sensitive adhesive may be excellently maintained.

The pressure-sensitive adhesive composition may further include an antistatic agent. For example, an ionic compound may be used as an antistatic agent. As the ionic compound, an organic salt, or an inorganic salt may be exemplified.

For example, as an inorganic salt, a metal salt including a metal ion as a cation may be used. Examples of the metal salt may include an alkali metal cation or alkali earth metal cation. As the cation, one or two or more types of lithium ion ($Li^+$), sodium ion ($Na^+$), potassium ion ($K^+$), rubidium ion ($Rb^+$), cesium ion ($Cs^+$), beryllium ion ($Be2^+$), magnesium ion ($Mg2^+$), calcium ion ($Ca^{2+}$), strontium ion ($Sr^{2+}$), and barium ion ($Ba^{2+}$) may be exemplified, and for example, one or two or more types of lithium ion, sodium ion, potassium ion, magnesium ion, calcium ion, and barium ion may be used, or in consideration of ion stability and mobility, lithium ion may be used.

As an organic salt, for example, an ionic compound including an organic cation may be used. As the organic cation, onium cation may be exemplified. In the present specification, the term "onium cation" may refer to a positively (+) charged ion including the structure, in which at least a part of the charge is widespread on an atom such as nitrogen (N), phosphorous (P), and/or sulfur (S). The onium cation may be a cyclic or noncyclic compound, and the noncyclic compound may be an aromatic or nonaromatic compound. The onium cation may further include other atoms, such as an oxygen or carbon atom, in addition to the nitrogen, phosphorus, and/or sulfur. The onium cation may be arbitrarily substituted by substituent, such as halogen, an alkyl group, or an aryl group. For example, the noncyclic compound may include one or four or more substituents, and the substituent may be a cyclic or noncyclic substituent or an aromatic or nonaromatic substituent.

Examples of the onium cation may include quaternary ammonium ions, such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium, or N-ethyl-N,N,N-trioctylammonium, phosphonium, pyridinium, imidazolium, pyrolidinium, or piperidinium.

Examples of an anion that is included in the ionic compounds, such as an inorganic salt or an organic salt may include $PF_6^-$, $AsF^-$, $NO2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), fluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), or trispentafluoroethyl trifluorophosphate ($P(C_2F_5)_3F_3^-$).

In another example, as the anion, bisfluorosulfonylimide or the anion represented by the following Chemical Formula 1 may be used.

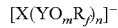 [Chemical Formula 1]

In Chemical Formula 1, X represents a nitrogen atom or a carbon atom, Y represents a carbon atom or a sulfur atom, $R_f$ represents a perfluoroalkyl group, m represents 1 or 2, and n represents 2 or 3.

In Chemical Formula 1, when Y is carbon, m may be 1; when Y is sulfur, m may be 2; when X is nitrogen, n may be 2; and when X is carbon, n may be 3.

The bis(fluorosulfonyl)imide or the anion represented by Chemical Formula 1 exhibits high electronegativity due to a perfluoroalkyl group ($R_f$) or a fluoro group; has a specific resonance structure; is weakly bound to a cation; and also has a hydrophobic property. Therefore, the ionic compound may exhibit excellent compatibility with other components in a composition, such as a polymer, and then may give a high antistatic property even in small quantity.

In Chemical Formula 1, $R_f$ may be a perfluoroalkyl group having 1 to 20 carbon atoms, 1 to 12 carbon atoms, 1 to 8 carbon atoms, or 1 to 4 carbon atoms, and in this case, the perfluoroalkyl group may have a linear, branched or cyclic structure. In Chemical Formula 1, the anion may be a sulfonylmethide-based, sulfonylimide-based, carbonylmethide-based, or carbonylimide-based anion, and may be particularly one type or the combination of two or more types of tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanecarbonylimide, or bispentafluoroethanecarbonylimide.

The ratio of an antistatic agent may be controlled in consideration of the desired antistatic property, and the like, and in one example, the antistatic agent may be included in the amount of about 0.1 parts by weight to 20 parts by weight, 0.1 parts by weight to 15 parts by weight, 0.1 parts by weight to 10 parts by weight, 0.1 parts by weight to 5 parts by weight, 0.1 parts by weight to 3 parts by weight, or 1 part by weight to 3 parts by weight, with respect to 100 parts by weight of the block copolymer.

The pressure-sensitive adhesive composition may further include a silane coupling agent. Examples of the silane coupling agent may include a silane coupling agent having a beta-cyano group or an acetoacetyl group. For example, the silane coupling agent may allow a pressure-sensitive adhesive formed by a low-molecular weight copolymer to exhibit excellent adhesiveness and adhesion stability, and also may allow the pressure-sensitive adhesive to maintain excellently endurance reliability under the heat-resisting or moisture and heat-resisting condition.

Examples of the silane coupling agent having a beta-cyano group or an acetoacetyl group may include a compound represented by the following Chemical Formula 2 or 3.

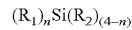 [Chemical Formula 2]

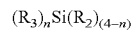 [Chemical Formula 3]

In Chemical Formula 2 or 3, $R_1$ represents a beta-cyanoacetyl group or a beta-cyanoacetylalkyl group, $R_3$ represents an acetoacetyl group or an acetoacetylalkyl group, $R_2$ represents an alkoxy group, and n represents a number of 1 to 3.

In Chemical Formula 2 or 3, the alkyl group may be an alkyl group having 1 to 20 carbon atoms, 1 to 16 carbon atoms, 1 to 12 carbon atoms, 1 to 8 carbon atoms, or 1 to 4 carbon atoms, and such an alkyl group may be a linear, branched, or cyclic phase. In addition, in Chemical Formula 2 or 3, the alkoxy group may be an alkoxy group having 1 to 20 carbon atoms, 1 to 16 carbon atoms, 1 to 12 carbon atoms, 1 to 8 carbon atoms, or 1 to 4 carbon atoms, and such an alkoxy group may be a linear, branched, or cyclic phase.

In addition, in Chemical Formula 2 or 3, for example, n may be 1 to 3, 1 to 2, or 1.

Examples of the compound represented by Chemical Formula 2 or 3 may include acetoacetylpropyl trimethoxy silane, acetoacetylpropyl triethoxy silane, beta-cyanoacetylpropyl trimethoxy silane, or beta-cyanoacetylpropyl troethoxy silane, but the present application is not limited thereto.

The silane coupling agent may be included in the amount of 0.01 parts by weight to 5 parts by weight or 0.01 parts by weight to 1 part by weight with respect to 100 parts by weight in the pressure-sensitive adhesive composition. Within such a range, the desired physical properties may be effectively given to a pressure-sensitive adhesive.

If necessary, the pressure-sensitive adhesive composition may further include a tackifier. Examples of the tackifier may include one type or the combination of two or more types of a hydrocarbon resin or a hydrogen additive thereof, a rosin resin or a hydrogen additive thereof, a rosin ester resin or a hydrogen additive thereof, a terpene resin or a hydrogen additive thereof, a terpene phenol resin or a hydrogen additive thereof, a polymerized rosin resin, or a polymerized rosin ester resin, but the present application is not limited thereto. The tackifier may be included in the amount of 100 parts by weight or less with respect to 100 parts by weight of the block copolymer.

The pressure-sensitive adhesive composition may further include one or more additives selected from the group consisting of a coordinate bonding compound that may form a coordinate bond with an antistatic gent, an epoxy resin, a curing agent, a UV stabilizer, an antioxidant, a toning agent, a reinforcing agent, a filler, an antifoaming agent, a surfactant, and a plasticizer if necessary.

A coating solid content in the pressure-sensitive adhesive composition may be 20 wt % or more or 25 wt % or more. In the present specification, the term "coating solid content" may refer to a solid content of a coating solution, that is, the pressure-sensitive adhesive composition at the time of being applied to a coating process in order to form a pressure-sensitive adhesive. Such a coating solid content may be measured by the way disclosed in the following Example, for example. In general, at the time of being applied to a coating process, the pressure-sensitive adhesive composition, that is, a coating solution may include the block copolymer, a cross-linking agent, an initiator, or other additives, and also solvents, and the like. The coating solid content may be adjusted to be 20 wt % or more, and thus the productivity of a pressure-sensitive adhesive, an optical film, or a display device may be maximized. The upper limit of the coating solid content is not particularly limited, and in consideration of the viscosity for being applied to a coating process, it may be properly controlled in the range of 50 wt % or less, 40 wt % or less, or 30 wt % or less, for example.

In addition, the pressure-sensitive adhesive composition may have the coating viscosity of about 500 cP to 3,000 cP at 23° C. The term "coating viscosity" may refer to the viscosity of a coating solution, that is, the pressure-sensitive adhesive composition at the time of being applied to a coating process in order to form a pressure-sensitive adhesive, and also the viscosity at the state of maintaining the coating solid content as described above. The coating viscosity may be within the range of 500 cP to 2,500 cP, 700 cP to 2,500 cP, 900 cP to 2,300 cP at 23° C., for example. The pressure-sensitive adhesive composition including the block copolymer may exhibit the level of viscosity, which can be effectively coated in the state of having high coating solid content.

The pressure-sensitive adhesive composition may have a gel fraction of 80 wt % or less after implementing a cross-linking structure. The gel fraction may be calculated by the following Equation 1.

$$\text{Gel fraction (\%)} = B/A \times 100 \quad [\text{Equation 1}]$$

In Equation 1, A represents the mass of the pressure-sensitive adhesive composition implementing a cross-linking structure, B represents the dry mass of the insoluble fraction, which is collected after depositing the pressure-sensitive adhesive composition having the mass A in the state of being put in the net having a size of 200 mesh, with ethyl acetate at room temperature for 72 hours.

By maintaining the gel fraction to be 80 wt % or less, workability, endurance reliability, and re-workability may be excellently maintained. The lower limit of the gel fraction of the pressure-sensitive adhesive composition is not particularly limited, and for example, may be 0 wt %. However, 0 wt % of the gel fraction may not refer to the meaning that the cross-linking does not completely progress in the pressure-sensitive adhesive composition. For example, the pressure-sensitive adhesive composition having 0 wt % of the gel fraction may include the pressure-sensitive adhesive composition, in which the cross-linking does not completely progress, or the pressure-sensitive adhesive composition, in which the cross-linking partly progresses, but the degree of the cross-linking is low, and thus the gel is not maintained in the net having a size of 200 mesh, and thus leaked from the net.

The pressure-sensitive adhesive composition may be used for various uses. As a typical use, the use thereof for a protection film or an optical film as will be described below may be exemplified, but the present application is not limited thereto.

In addition, the present application relates to a protection film. For example, the protection film may be used for the use for protecting the surfaces of various optical films.

Here, as an optical film, a polarizing plate, a polarizer, a polarizer protection film, a retardation film, a viewing angle compensation film, or a luminance improving film may be exemplified, but the present application is not limited thereto. In the present specification, the terms "polarizer" and "polarizing plate" refer to the objects that are different from each other. In other words, the polarizer refers to a film, sheet, or device itself that exhibits a polarization function, and the polarizing plate refers to an optical element including other elements along with the polarizer. As other elements that may be included in an optical element, along with the polarizer, a polarizer protection film or a retardation layer may be exemplified, but the present application is not limited thereto.

For example, the protection film may include a protection substrate layer, and a pressure-sensitive adhesive layer on one side or both sides of the substrate layer. For example, the pressure-sensitive adhesive layer may include the pressure-sensitive adhesive composition. For example, the pressure-sensitive adhesive composition may be included in the pressure-sensitive adhesive layer in the cross-linked state, that is, the state of implementing the cross-linking structure.

The protection base layer may be a general film or sheet that is known in the related art. Examples thereof may include a polyester film, such as polyethyleneterephthalate or polybutyleneterephthalate, or a plastic film, such as a polytetrafluoroethylene film, a polyethylene film, a polypropylene film, a polybutene film, a polybutadiene film, a poly(vinyl chloride) film, or a polyimide film. These films may be one layer, or may be laminated in two or more layers. In some cases, these films may further include a functional layer, such as an anti-fouling layer. In addition, in terms of the base adhesiveness improvement, a surface treatment, such as a primer treatment may be performed on one side or both sides of the base.

The thickness of the base layer may be properly selected according to the use, and is not particularly limited. In general, the base layer may be formed in the thickness of 5 µm to 500 µm or 10 µm to 100 µm.

The thickness of the pressure-sensitive adhesive layer included in the protection film is not particularly limited, but for example, may be 2 µm to 100 µm or 5 µm to 50 µm, The pressure-sensitive adhesive composition may be used for an optical film. Examples of the use of the optical film may include the uses for laminating a polarizing plate, a polarizer, a retardation film, an anti-glare film, a wide viewing angle compensation film, or a luminance improving film, one another, or for attaching the optical film or the laminate thereof on an adherent, such as a liquid crystal panel.

In other words, the present application also relates to a pressure-sensitive adhesive optical laminate. As a typical optical laminate, an optical film, and a pressure-sensitive adhesive layer being formed on one side or both sides of the optical film may be included. For example, the pressure-sensitive adhesive layer may be for attaching the optical film on a liquid crystal panel of a LCD device, or other optical films or for laminating other optical films on the laminate. The pressure-sensitive adhesive layer may include the pressure-sensitive adhesive composition. For example, the pressure-sensitive adhesive composition may be included in the pressure-sensitive adhesive layer in the state of implementing the cross-linking structure. Here, as the optical film, a polarizer, a retardation film, or a luminance improving film, or the laminate prepared by laminating two or more types among them may be exemplified.

In addition, the present application relates to a pressure-sensitive adhesive polarizing plate. For example, the polarizing plate may have the structure having a polarizer as an optical film in the pressure-sensitive adhesive optical laminate.

A type of the polarizer included in the polarizing plate is not particularly limited, and for example, a general type that is known in the related art, such as a polyvinyl alcohol-based polarizer, may be applied without limitation.

The polarizer is a functional film that may extract only the light vibrating in one direction from the incident light while vibrating in a variety of directions. The polarizer may be a form having the dichroic pigments that are adsorbed and arranged on a polyvinyl alcohol-based resin film, for example. The polyvinyl alcohol-based resin constituting the polarizer may be obtained by the gelation of a polyvinyl acetate-based resin, for example. In this case, the available polyvinyl acetate-based resin may include a vinyl acetate homopolymer, and also a copolymer of the monomers that may be copolymerized therewith. Examples of the monomers that may be copolymerized with the vinyl acetate may include one type or the combination of two or more types of unsaturated carboxylic acids, olefins, vinyl ethers, unsaturated sulfonic acids, and acrylamides having an ammonium group, but the present application is not limited thereto. The degree of gelation of the polyvinyl alcohol-based resin may be generally about 85 mol % to 100 mol %, and preferably, 98 mol % or more. The polyvinyl alcohol-based resin may be further modified, and for example, a polyvinyl acetal or a polyvinyl formal modified with aldehydes may be used. In addition, the degree of polymerization of the polyvinyl alcohol-based resin may be generally about 1,000 to about 10,000 or about 1,500 to about 5,000.

The polarizer may be prepared by an elongation (uniaxually elongation) process of the above-described polyvinyl alcohol-based resin film; a process of staining the polyvinyl alcohol-based resin film with the dichroic pigments and then adsorbing the dichroic pigments; a process of treating the polyvinyl alcohol-based resin film adsorbed with the dichroic pigments with an aqueous boric acid solution; and then washing the film after treating with the aqueous boric acid solution. Here, as the dichroic pigments, iodine or a dichroic organic dye may be used.

The polarizing plate may further include a protection film that is attached on one side or both sides of the polarizer. In this case, the pressure-sensitive adhesive layer may be formed on one side of the protection film. A type of the protection film is not particularly limited, but for example, may be the film having the laminated structure of one layer or two or more layers of a cellulose-based film, such as triacetyl cellulose (TAC); a polycarbonate film or a polyester-based film, such as poly(ethylene terephthalate) (PET); a polyethersulfone-based film; or a polyethylene film, a polypropylene film, or a polyolefin-based film prepared using a resin having a cyclo-based or norbornene-based structure, or a ethylene-propylene copolymer.

The polarizing plate may further include one or more functional layers selected from the group consisting of a protection layer, a reflective layer, an anti-glare layer, a retardation plate, an optical viewing angle compensation film, and a luminance improving film.

In the present application, a method of forming a pressure-sensitive adhesive layer on the protection film, the polarizing plate, or the optical film is not particularly limited, and for example, the method may be a way of implementing a cross-linking structure by directly coating a substrate with the pressure-sensitive adhesive composition and then curing, or a way of transferring a cross-linking structure after forming the cross-linking structure by coating the release treating side of a releasing film with the pressure-sensitive adhesive composition and then curing.

A pressure-sensitive adhesive composition-coating method is not particularly limited, and for example, a way of applying the pressure-sensitive adhesive composition using a general means, such as a bar coater may be used.

In the coating process, it is preferable that the multifunctional cross-linking agent included in the pressure-sensitive adhesive composition be controlled so as not to progress a cross-linking reaction of the functional group in terms of the performance of the uniform coating process. Therefore, the cross-linking agent may form the cross-linking structure in the curing and aging processes after the coating operation to improve the cohesive strength of a pressure-sensitive adhesive, and adhesion physical properties and cuttability.

In addition, it is preferable to perform the coating process after sufficiently removing bubble-inducing components, such as reaction residue or volatile components in the pressure-sensitive adhesive composition. Therefore, it is possible to prevent the problems in that the modulus of elasticity is decreased due to the extremely low molecular weight or cross-linking density of the pressure-sensitive adhesive and scatterer is internally formed due to the large bubbles between a glass plate and a pressure-sensitive adhesive layer in the state of a high temperature.

A method of implementing a cross-linking structure through curing a pressure-sensitive adhesive composition is not particularly limited, and for example, the method may be performed by a way of maintaining the coating layer at a proper temperature to induce the cross-linking reaction with a block copolymer included in the coating layer by a multifunctional cross-linking agent.

In addition, the present application relates to a display device, for example, a LCD device. Examples thereof may include the above-described optical laminate or polarizing plate. When the display device is a LCD, the device may include a liquid crystal panel, and the polarizing plate or optical laminate attached on one side or both sides of the liquid crystal panel. The polarizing plate or optical laminate may be attached on the liquid crystal panel by the above-described pressure-sensitive adhesive. Examples of the liquid crystal panel applied to a LCD may include all the known panels, for example, a panel having a manual matrix system, such as a twisted nematic (TN), super twisted nematic (STN), ferroelectric (F), or polymer dispersed (PD) type; a panel having an active matrix system, such as a two terminal or three terminal type; and an in plane switching (IPS) type panel and a vertical alignment (VA) panel.

The types of other constitutions of a display device, for example, upper and lower substrates, such as, a color filter substrate or an array substrate for a LCD, are not particularly limited, and the constituents that are known in the related art may be applied without limit.

Effect

The present application can provide a pressure-sensitive adhesive composition that can form a pressure-sensitive adhesive having excellent in various physical properties, such as endurance reliability, excellent antistatic performance, and the few change in the antistatic performance over time after the endurance condition. The pressure-sensitive adhesive composition can be used for an optical film, such as a protection film and a polarizing plate, for example.

DETAILED DESCRIPTION

The pressure-sensitive adhesive composition will be described below in detail with reference to the accompanying Examples and Comparative Examples. The range of the pressure-sensitive adhesive composition is not limited to the following Examples.

1. Molecular Weight Evaluation

A number average molecular weight (Mn) and molecular weight distribution (PDI) were measured using a gel permeation chromatograph under the following conditions, and the measured results were converted using standard polystyrene of Aglient system to prepare a calibration curve.

<Measuring Conditions>
Measuring instrument: Agilent GPC (Agilent 1200 series, U.S.)
Column: two PL Mixed B-connected
Column temperature: 40° C.
Eluant: tetrahydrofuran (THF)
Flow rate: 1.0 mL/min
Concentration: about 1 mg/mL (100 μL injection)

2. Surface Resistance Evaluation (Initial, Heat-Resisting, and Moisture and Heat-Resisting Surface Resistance)

The polarizing plate prepared in Examples or Comparative Examples was cut to have a width length of 5 cm and a height length of 5 cm to prepare a specimen. The prepared specimens (a laminating structure of TAC/PVA/TAC/PSA/PET: TAC=triacetyl cellulose, PVA=polyvinyl alcohol-based polarizing film, PSA=pressure-sensitive adhesive layer, PET=releasing film), the initial surface resistance (surface resistance before evaluating endurance reliability) of the pressure-sensitive adhesive layer was measured after peeling the releasing film off. After that, the specimen after measuring the initial surface resistance was left at 80° C. for 7 days, and the, the appearance thereof was evaluated. In addition, the specimen after measuring the initial surface resistance was left under the conditions of 60° C. and 90% relative humidity for 7 days, and then the surface resistance thereof (surface resistance after evaluating endurance reliability) was measured in the same way as described above. The surface resistance was measured according to the manual of a manufacturer using a measuring instrument (Hiresta-UP (MCP-HT 450, Mitsubishi chemical)).

<Measuring Conditions>
Measuring instrument: Hiresta-UP (MCP-HT 450, Mitsubishi chemical)
Probe: URS
Voltage: 500 V 3. Durability Evaluation (Heat-Resisting and Moisture and Heat-Resisting Durability)

The polarizing plate prepared in Examples or Comparative Examples was cut to have a width of about 180 mm and a length of about 320 mm to prepare a specimen. And then, the specimen was attached to an available 19-inch panel. Since then, the panel was stored in an autoclave (50° C., 5 atmospheres) for about 20 minutes to prepare a sample. For the prepared sample, (1) heat-resisting durability was evaluated under the following criteria by observing the generations of bubbles and peeling after maintaining the sample at 80° C. for 500 hours, and (2) moisture and heat-resisting durability was evaluated under the following criteria by also observing the generations of the bubbles and peeling on the adhesion interface after putting the sample at the conditions of 60° C. and 90% relative humidity for 500 hours.

<Evaluating Criteria>
A: No generation of bubbles and peeling
B: Slightly generation of bubbles and peeling
C: Generation of bubbles and peeling in large quantities 4. Calculation of Glass Transition Temperature The glass transition temperature (Tg) of each of the blocks of the block copolymer was calculated according to the following Equation.

$$1/Tg = \Sigma Wn/Tn \qquad \text{<Equation>}$$

In Equation, Wn represents a weight fraction of the monomer used in each of the blocks, and Tn represents a glass transition temperature that is exhibited when the monomers used forms a homopolymer.

In other words, the right side of Equation is the result obtained by summing up the values calculated after calculating the values (Wn/Tn) obtained by dividing the weight fraction of the monomers used by the glass transition temperatures that are exhibited when the monomers form homopolymers for the respective monomers.

Preparation Example 1. Preparation of Block Copolymer (A1)

0.29 g of ethyl 2-bromoisobutyrate (EBiB) and 44.3 g of methylmethacrylate (MMA) were mixed with 17 g of ethyl acetate (EAc). After that, 0.008 g of CuBr$_2$, 0.002 g of tris(2-pyridylmethyl)amine (TPMA), and 0.06 g of V-65 (2,2'-azobis(2,4-dimethyl valeronitrile)) were further added to the mixture thus obtained, and then were mixed. A flask containing the mixture thus obtained was sealed, and then stirred under a nitrogen atmosphere at about 25° C. for about 30 minutes. After that, by bubbling, the dissolved oxygen was removed. The mixture without oxygen was dipped in a reactor at about 67° C. to initiate the reaction (polymerization of first block). When the conversion rate of methylmethacrylate became about 75%, the bubbling was performed with nitrogen in advance, and then the mixture of 30.8 g of 2-dimethylamino ethyl acrylate (DMAEA), 123 g of butyl acrylate (BA), 3.8 g of hydroxybutyl arylate (HBA), and 202 g of ethyl acetate (EAc) was added under nitrogen. After that, 0.002 g of CuBr$_2$, 0.006 g of TPMA, and 0.05 g of V-65 were put into the reaction flask to perform a chain extension reaction (polymerization of second block). When the conversion rate of the monomer (BA) became 80% or more, the reaction mixture was exposed with oxygen and then diluted with a proper solvent to stop the reaction to prepare the block copolymer (in the process, V-65 was properly divided and then added until the reaction end time in consideration of the half-life thereof).

Preparation Examples 2 to 5. Preparations of Block Copolymers (A2, A3, B1, and B2)

The types of the raw materials (monomers) that were used when polymerizing the block copolymers were controlled to have the compositions as listed in the following Table 1, thereby preparing each of the block copolymer.

TABLE 1

|  |  | Block copolymer | | | | |
| --- | --- | --- | --- | --- | --- | --- |
|  |  | A1 | A2 | A3 | B1 | B2 |
| First block | MMA ratio | 26 | 26 | 26 | 26 | 21.1 |
|  | BMA ratio | — | — | — | — | 4.2 |
|  | HPMA ratio | — | — | — | — | 0.8 |
|  | Tg (° C.) | 110 | 110 | 110 | 110 | 90 |
|  | Mn (×10000) | 1.9 | 1.9 | 1.9 | 1.9 | 2.3 |
|  | PDI | 1.27 | 1.27 | 1.27 | 1.27 | 1.36 |
| Second block | BA ratio | 58 | 68 | 68 | 72 | 58 |
|  | HBA ratio | 2 | 2 | 2 | 2 | 2 |
|  | DMAEA ratio | 14 | 4 | — | — | 14 |

TABLE 1-continued

|  |  | Block copolymer | | | | |
| --- | --- | --- | --- | --- | --- | --- |
|  |  | A1 | A2 | A3 | B1 | B2 |
|  | HEAA ratio | — | — | 4 | — | — |
|  | Tg (° C.) | −41 | −45 | −42 | −46 | −41 |
| Block | Mn (×10000) | 10.6 | 10.1 | 10.2 | 10.8 | 12.2 |
| copolymer | PDI | 1.7 | 1.6 | 1.7 | 1.5 | 1.8 |

Ratio unit: part by weight
Tg: glass transition temperature
Mn: number average molecular weight
PDI molecular weight distribution
BA: butyl acrylate
HBA: 4-hydroxybutyl acylate
MMA: methyl methacrylate
BMA: butyl methacrylate
HPMA: 2-hydroxypropyl methacylate
DMAEA: dimethylaminoethyl acrylate
HEAA: hydroxyethyl acrylamide

Preparation Example 6. Preparation of Random Copolymer (B3)

The monomer mixture of 46 g of butyl acrylate (BA) and 1.3 g of hydroxyethyl acrylate (2-HEA) was put into a 1 L reactor having a cooling device for refluxing nitrogen gas and being easy to control a temperature control, and then as a solvent, 32 g of ethyl acetate (EAc) was put thereinto. After that, in order to remove oxygen, the nitrogen gas purging was performed for 1 hour, and then the reactor was maintained at 62° C. After uniformly being the mixture thus obtained, as a reaction initiator, 1 g of azobisisobutyronitrile (AIBN), which was diluted with ethyl acetate to have a concentration of 50%, was put into the reactor, and then the reaction was performed for 8 hours to prepare an acrylic-based copolymer without involving N.

Example 1

Preparation of Coating Solution (Pressure-Sensitive Adhesive Composition)

0.5 parts by weight of a cross-linking agent (Coronate L, manufactured by Japan NPU), 0.1 parts by weight of dibutyltin dilaurate (DBTDL), and 0.2 parts by weight of the silane coupling agent having a beta cyanoacetyl group and an inorganic salt (LiTFSi, lithium trifluorosulfonylimide), an antistatic agent, were mixed with respect to 100 parts by weight of the block copolymer (A1) prepared in Preparation Example 1, and then, as a solvent, ethyl acetate was blended to control the coating solid content to be about 30 wt % to prepare a coating solution (pressure-sensitive adhesive composition).

Preparation of Pressure-Sensitive Adhesion Polarizing Plate

The release treating side of a releasing PET (poly(ethylene terephthalate) (MRF-38, manufactured by Mitsubishi) that was subjected to a releasing treatment and had a thickness of 38 μm was coated with the prepared coating solution to have the thickness of about 23 μm after drying, and then maintained in an oven of 110° C. for about 3 minutes. The coating layer formed on the releasing PET was laminated on a WV liquid crystal layer of the polarizing plate (laminated structure of TAC/PVA/TAC: TAC=triacetyl cellulose, PVA=polyvinyl alcohol-based polarizing film) coated with the WV (wide view) liquid crystal layer after drying to prepare a pressure-sensitive adhesion polarizing plate.

Example 2

A pressure-sensitive adhesive composition (coating solution) and pressure-sensitive adhesion polarizing plate were prepared in the same method as Example 1, except that the copolymer (A2) prepared in Preparation Example 2 was used as a block copolymer when preparing the pressure-sensitive adhesive composition (coating solution).

Example 3

A pressure-sensitive adhesive composition (coating solution) and pressure-sensitive adhesion polarizing plate were prepared in the same method as Example 1, except that the copolymer (A2) prepared in Preparation Example 2 was used as a block copolymer and an organic salt (tributylmethyl Ammonium Bis(trifluoromethanesulfone)imide) was used as an antistatic agent instead of an inorganic salt, when preparing the pressure-sensitive adhesive composition (coating solution).

Example 4

A pressure-sensitive adhesive composition (coating solution) and pressure-sensitive adhesion polarizing plate were prepared in the same method as Example 1, except that the copolymer (A3) prepared in Preparation Example 3 was used as a block copolymer when preparing the pressure-sensitive adhesive composition (coating solution).

Comparative Example 1

A pressure-sensitive adhesive composition (coating solution) and pressure-sensitive adhesion polarizing plate were prepared in the same method as Example 1, except that the copolymer (B1) prepared in Preparation Example 4 was used as a block copolymer when preparing the pressure-sensitive adhesive composition (coating solution).

Comparative Example 2

A pressure-sensitive adhesive composition (coating solution) and pressure-sensitive adhesion polarizing plate were prepared in the same method as Example 1, except that the block copolymer (B2) prepared in Preparation Example 5 was used instead of the block copolymer of Preparation Example 1 when preparing the pressure-sensitive adhesive composition (coating solution).

Comparative Example 3

A pressure-sensitive adhesive composition (coating solution) and pressure-sensitive adhesion polarizing plate were prepared in the same method as Example 1, except that the block copolymer (B3) prepared in Preparation Example 6 was used instead of the block copolymer of Preparation Example 1 when preparing the pressure-sensitive adhesive composition (coating solution).

The results evaluated for the following Examples and Comparative Examples are listed in the following Table 2.

TABLE 2

| | | Example | | | | Comparative Example | | |
|---|---|---|---|---|---|---|---|---|
| | | 1 | 2 | 3 | 4 | 1 | 2 | 2 |
| Surface resistance ($\times 10^{10}$ $\Omega/\square$) | Before evaluating endurance reliability | 2.2 | 3.1 | 3.7 | 2.8 | 2.4 | 2.3 | 590 |
| | After evaluating endurance reliability | 2.5 | 3.7 | 3.9 | 3.1 | 78 | 2.7 | 3700 |
| Change of surface resistance | | Small | Small | Small | Small | big | Small | big |
| Endurance reliability (heat-resisting) | | A | A | A | A | A | C | B |
| Endurance reliability (moisture and heat-resisting) | | A | A | A | A | A | C | C |

What is claimed is:

1. A pressure-sensitive adhesive composition comprising:
a block copolymer including a first block having a glass transition temperature of 50° C. or higher, and a second block having a glass transition temperature of −10° C. or lower, the second block including a copolymer which is derived from (meth)acrylic acid ester monomer, a copolymeric monomer having a cross-linkable functional group, and a compound containing a nitrogen atom; and
an antistatic agent,
wherein the first block consists of a homopolymer which is derived from (meth)acrylic acid ester monomer,
the block copolymer is a diblock copolymer having the first block and the second block, and
the diblock copolymer is the only block copolymer in the pressure-sensitive adhesive composition.

2. The pressure-sensitive adhesive composition of claim 1, wherein the compound containing a nitrogen atom is an amide group-containing compound, an amino group-containing compound, an imide group-containing compound, or a cyano group-containing compound.

3. The pressure-sensitive adhesive composition of claim 2, wherein the amide group-containing compound is (meth)acrylamide, N,N-dialkyl (meth)acrylamide, N-alkylrol (meth)acrylamide, diacetone (meth)acrylamide, N-vinylacetamide, N,N-alkylene bisacrylamide, N-hydroxyalkyl (meth)acrylamide, N-hydroxy alkylaminoalkyl (meth)acrylamide, N-(2-aminoethyl)acrylamide hydrochloride, N-(3-aminopropyl)methacrylamide hydrochloride, N-(t-butoxycarbonyl-aminopropyl)methacrylamide, N,N-dialkylaminoalkyl (meth)acrylamide, N-vinylpyrrolidone, N-vinylcaprolactam, or (meth)acryloylmorpholine; the amino group-containing compound is aminoalkyl (meth)acrylate, N-alkylaminoalkyl (meth)acrylate, or N,N-dialkylaminoalkyl (meth)acrylate; the imide group-containing compound is N-alkyl maleimide or itaconimide; and the cyano group-containing compound is (meth)acrylonitrile.

4. The pressure-sensitive adhesive composition of claim 1, wherein the compound containing a nitrogen atom is aminoalkyl (meth)acrylate, alkylaminoalkyl (meth)acrylate, dialkylaminoalkyl (meth)acrylate, or hydroxyalkyl (meth)acrylamide.

5. The pressure-sensitive adhesive composition of claim 1, wherein the block copolymer includes 5 parts by weight to 50 parts by weight of the first block and 50 parts by weight to 95 parts by weight of the second block.

6. The pressure-sensitive adhesive composition of claim 1, wherein the (meth)acrylic acid ester monomer is alkyl methacrylate.

7. The pressure-sensitive adhesive composition of claim 1, wherein the (meth)acrylic acid ester monomer is methyl methacrylate.

8. The pressure-sensitive adhesive composition of claim 1, wherein the second block includes a copolymer which is derived from 60 parts by weight to 99.8 parts by weight of the (meth)acrylic acid ester monomer, 0.1 parts by weight to 10 parts by weight of the copolymeric monomer having a cross-linkable functional group, and 0.1 parts by weight to 30 parts by weight of the compound containing a nitrogen atom.

9. The pressure-sensitive adhesive composition of claim 1, wherein the (meth)acrylic acid ester monomer is alkyl acrylate, and the second block includes a copolymer which is derived from 60 parts by weight to 99.8 parts by weight of the alkyl acrylate, 0.1 parts by weight to 10 parts by weight of the copolymeric monomer having a cross-linkable functional group, and 0.1 parts by weight to 30 parts by weight of the compound containing a nitrogen atom.

10. The pressure-sensitive adhesive composition of claim 1, further comprising a multifunctional cross-linking agent having two or more functional groups capable of reacting with the cross-linkable functional group.

11. The pressure-sensitive adhesive composition of claim 10, wherein the cross-linking agent is included in an amount of 0.01 parts by weight to 10 parts by weight with respect to 100 parts by weight of the block copolymer.

12. The pressure-sensitive adhesive composition of claim 1, wherein the antistatic agent is an organic salt or a metal salt.

13. The pressure-sensitive adhesive composition of claim 1, wherein the antistatic agent is included in an amount of 0.1 parts by weight to 20 parts by weight with respect to 100 parts by weight of the block copolymer.

14. A protection film comprising:
a protection base layer; and
the pressure-sensitive adhesive composition of claim 1, which is present at one side or both sides of the protection base layer.

15. A pressure-sensitive adhesive optical laminate comprising:
an optical film; and
a pressure-sensitive adhesive layer containing the pressure-sensitive adhesive composition of claim 1, which is present at one side or both sides of the optical film.

16. A pressure-sensitive adhesive polarizing plate comprising:
a polarizer; and
a pressure-sensitive adhesive layer containing the pressure-sensitive adhesive composition of claim 1, which is present at one side or both sides of the polarizer.

17. A display device comprising:
the pressure-sensitive adhesive optical laminate of claim 15.

18. A display device comprising:
the pressure-sensitive adhesive polarizing plate of claim 16.

* * * * *